June 7, 1932.  J. P. SEAHOLM  1,861,667
DISK CULTIVATOR OR PLOW
Filed Oct. 21, 1929  4 Sheets-Sheet 1
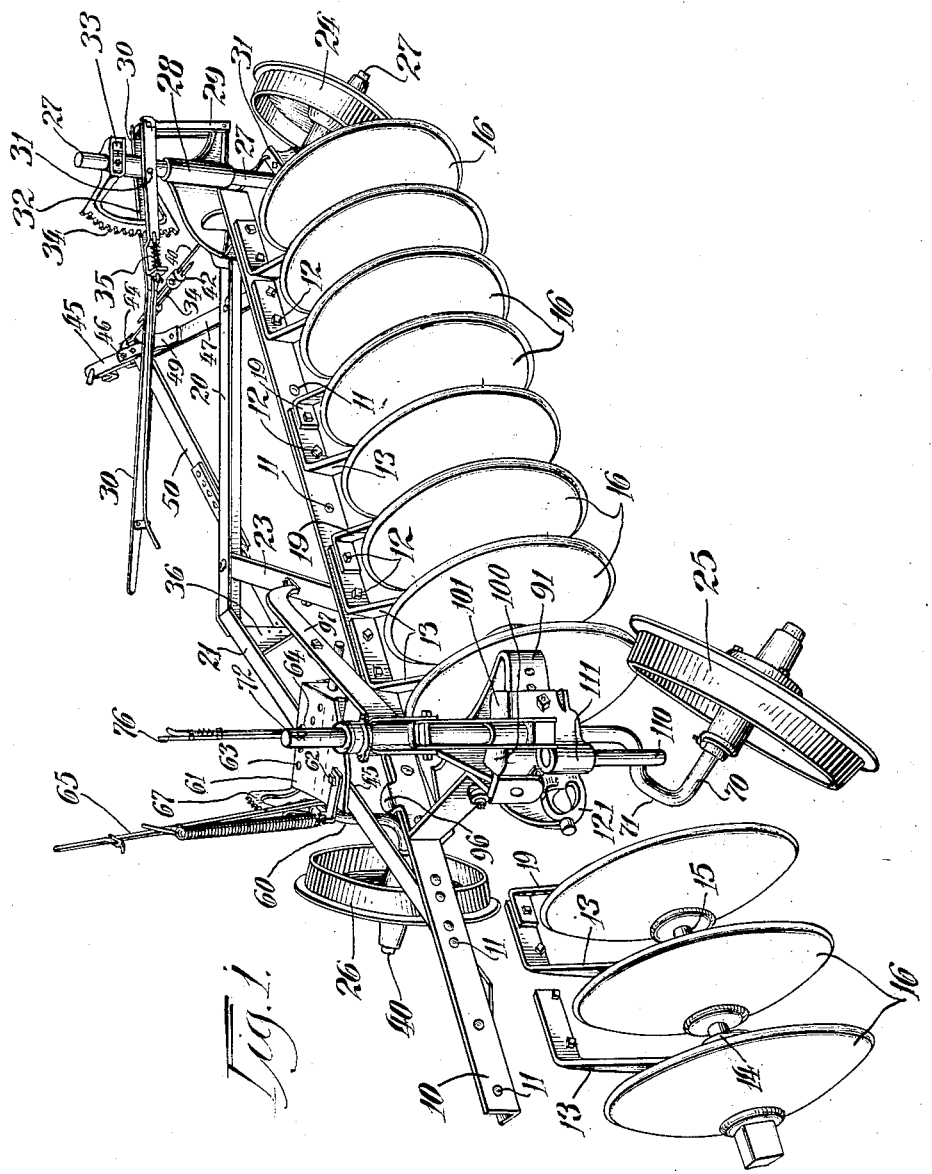
Inventor:
John P. Seaholm,
By Rector, Hibben, Davis, & Macauley
Attorneys

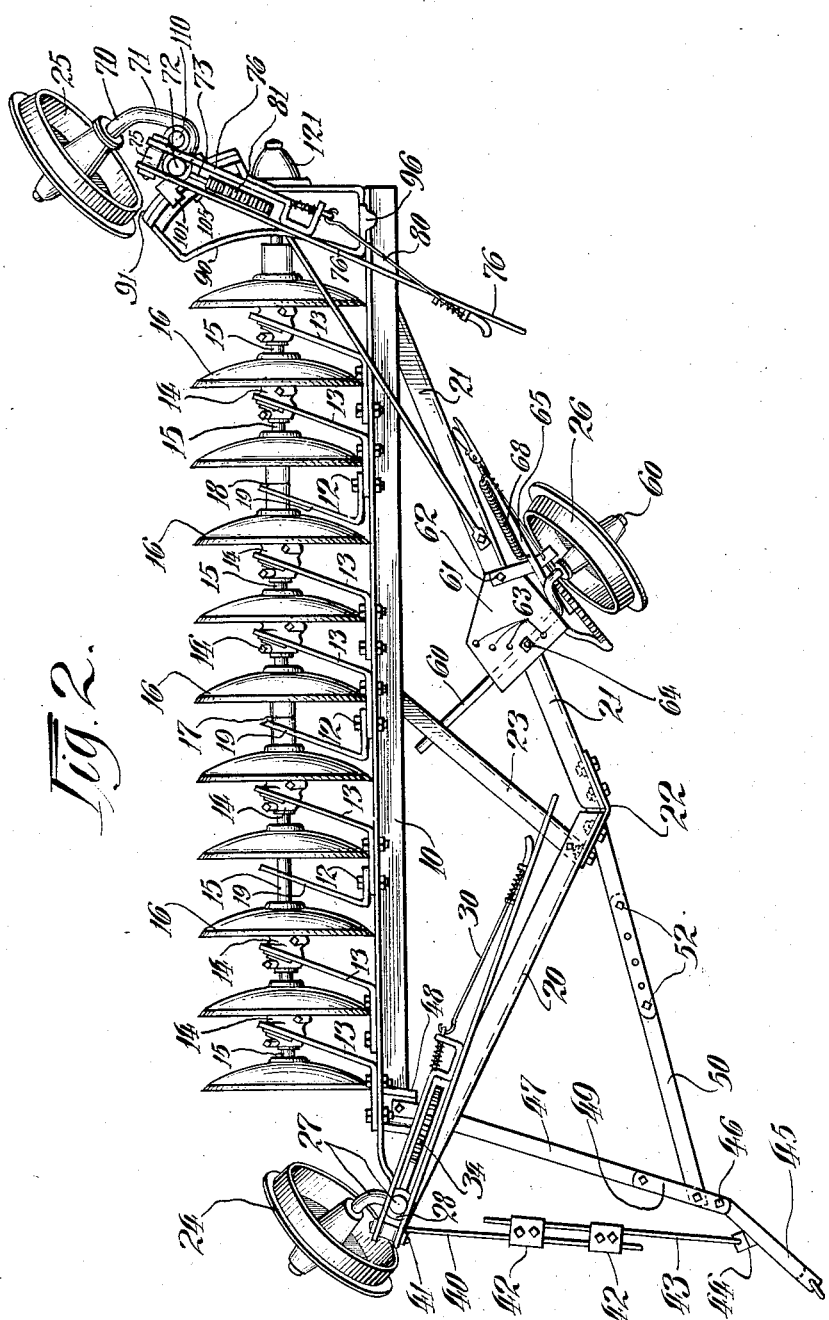

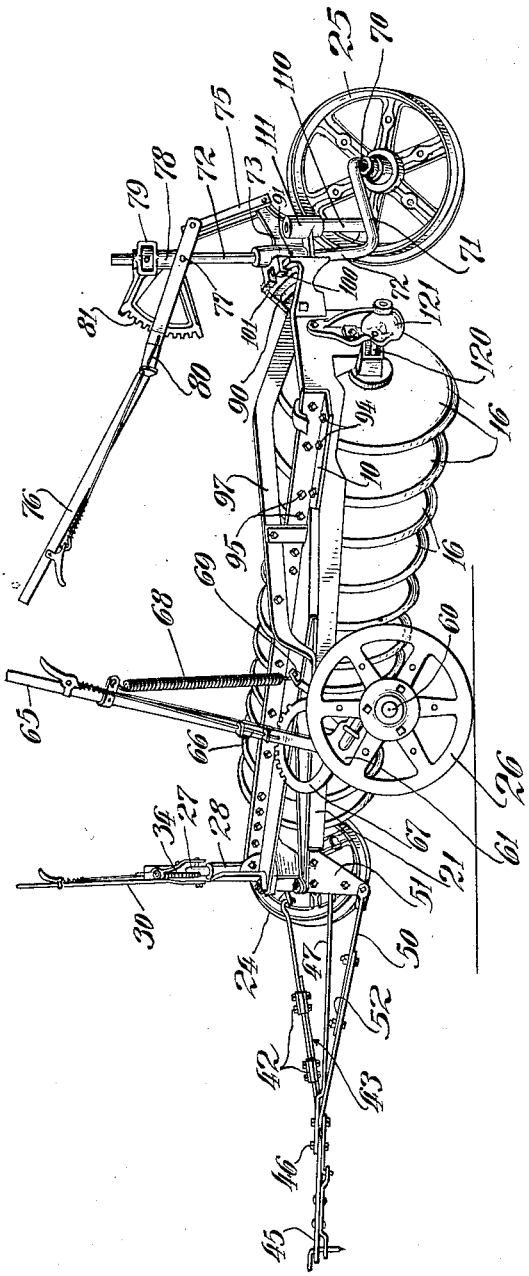

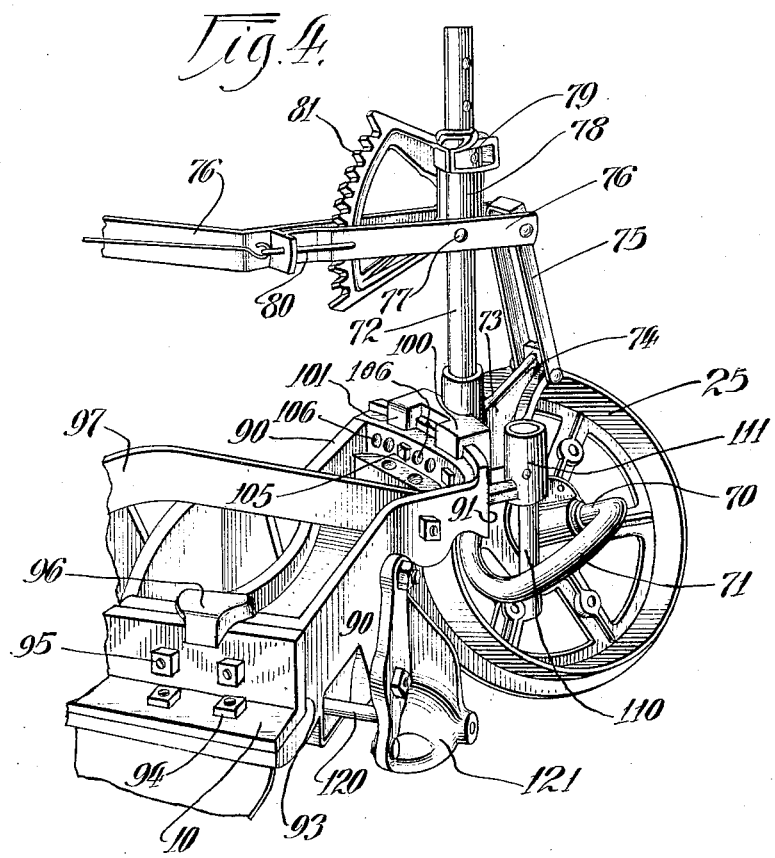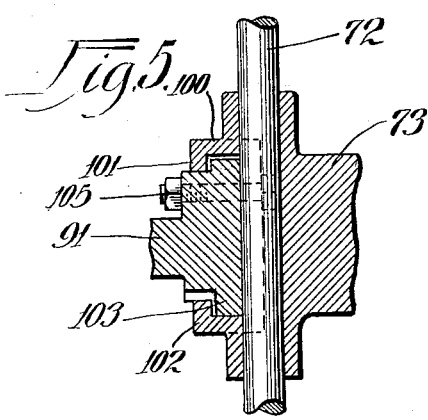

Patented June 7, 1932

1,861,667

UNITED STATES PATENT OFFICE

JOHN P. SEAHOLM, OF MOLINE, ILLINOIS, ASSIGNOR TO MINNEAPOLIS-MOLINE POWER IMPLEMENT COMPANY, OF MOLINE, ILLINOIS, A CORPORATION OF DELAWARE

DISK CULTIVATOR OR PLOW

Application filed October 21, 1929. Serial No. 401,081.

This invention relates to a disk cultivator or plow of the type used for preparing seed beds for agricultural crops. Cultivators or plows of this general type are shown, for example, in the patent to Grant No. 853,510, the present invention relating to certain improvements in this type of implement.

The general object of the invention is to provide an improved disk cultivator or plow of the type in which all the disks are connected so as to revolve together.

A more particular object is to provide an improved combination and arrangement of parts in an implement of this character that will eliminate clogging, place the weight of the implement on the cutting disks to assist them in penetrating, and, at the same time, reduce the draft required to pull the implement.

Another object is to provide, in an implement of the type described, an improved mounting for the rear furrow wheel to enable it to be adjusted to its most effective position for the different angles of operation of the plow.

A further object is to provide an improved disk cultivator and plow that may be readily adjusted to vary the width of cut of the plow.

Other objects and advantages of the invention will appear from the specification and drawings.

An embodiment of the invention is shown in the accompanying drawings in which:

Figure 1 is a rear perspective view of the improved disk plow;

Fig. 2 is a plan view of the plow;

Fig. 3 is a side elevation;

Fig. 4 is a perspective of the rear furrow wheel and its adjusting connections;

Fig. 5 is a section through the adjusting connections for the rear furrow wheel illustrated in Fig. 4.

The cultivator has a frame including a main beam 10 (Figs. 1 and 2) in the form of an angle iron bar provided with a plurality of holes 11 for receiving bolts 12 by means of which arms 13 are rigidly fastened to the beam. The arms 13 support bearings 14 carrying a disk shaft 15 to which the disks 16 are fastened. The disk shaft 15 is in three sections which are disconnectible at the points 17 and 18 but the sections are coupled together securely so that all the disks 16 rotate together as if rigidly connected to a single disk shaft. A series of disk cleaning arms 19 are attached to the beam 10, these arms being similar in shape to the arms 13. It should be noted that the arms 13 and 19 occupy only a very small lateral space between the disks, towit, about three-fourths of an inch. The arms project to the rear of beam 10 and they are inclined downward and to the right as viewed in Fig. 2, the lower end of each arm being nearer the face of the disk than any other part of the arm. This positioning of the arms eliminates wedge pockets between the disks and their supports and thus reduces any tendency for trash to accumulate or clog between the disks and their supports.

Connected to the ends of the beam 10 and converging forward therefrom are two frame members 20 and 21 which are connected together at their front ends by a plate 22 and suitably braced by a cross brace 23 extending from the beam 10 to the frame member 20. The plow frame is supported by three wheels, the front furrow wheel 24, the rear furrow wheel 25 and the land wheel 26.

The front furrow wheel 24 is journaled on an inclined portion of an axle 27, said axle also having a vertical portion slidably and rotatably mounted in a bracket 28 (Fig. 1) fixed to the corner of the plow frame. Pivoted to the bracket 28 is a U-shaped link 29 whose upper end is pivotally connected to one end of a hand lever 30. The hand lever 30 is pivoted at 31 to a bracket 32 held against vertical movement on axle 27 by a collar 33 fixed to said axle. This arrangement allows the axle to rotate relative to the bracket but prevents relative longitudinal movement between the axle and bracket. The bracket 32 has a toothed sector portion 34 with which cooperates a hand operated latch 35 carried by the lever 30. When the lever 30 is raised from the position illustrated in Fig. 1, it swings on its pivot 32 which lowers link 29 and bracket 28 thereby lowering the frame of the plow relative to the wheel 24. When lever 30 is forced down the reverse action takes place, that is, the plow frame is raised. The wheel 24 is positioned at an angle such as illustrated in order to prevent side slip of the plow under the side thrust caused by the plowing disks during operation.

The front furrow wheel 24 is moved angularly by rotative movement of the vertical portion of the axle 27 in the brackets 28 and 32 through an adjustable connection including a rod 40 (Fig. 2) connected at one end to an arm 41 fixed to the axle 27 and at its other end to adjustable clamps 42. The clamps 42 also grasp a second rod 43 that is pivoted to an extension 44 of a clevis 45 pivoted at 46 to a draft bar 47. The draft bar 47 is pivoted at its rear end to a bracket 48 carried by the main beam 10. At its front end the draft bar 47 has a member 49 fixed to it in spaced relation and pivoted between the member 49 and bar 47 is the front end of a second draft bar 50 which is pivoted at its rear end to a plate 51 (Fig. 3) fixed to the frame member 18. The draft bar 50 is made in two sections which are adjustably connected together at 52 so that the length of the bar may be varied.

The clevis 45 is adapted to be connected to a tractor and, when the tractor is turned, the clevis turns on its pivot 46. This either pulls or pushes on the bars 43—40 depending on which way the tractor is turned but, in either event, the axle 27 is turned to swing the wheel 24 with the tractor.

The adjustability of the draft connection at 52 enables an operator to quickly vary the position of the hitch pivot 46 for various widths of tractors so that the front disk will have the proper amount of land to plow for each tractor to which the plow may be connected.

It will be observed, by reference to Figs. 1 and 3, that the plow frame is relatively high above the ground but that the draft bars are connected to the plow at points relatively close to the ground. This is advantageous in that the draft tends to lift the front end of the plow to thereby shift the weight of the frame onto the plowing disks where it is useful in causing them to penetrate the hard ground on which the plow is often used.

The land wheel 26 is journaled on a crank axle 60 (Fig. 2) journaled in an angular bearing plate 61. This bearing plate is pivotally secured at 62 to the frame bar 21 and it has a series of holes 63 in its edge for the reception of a bolt 64 for securing the plate firmly in adjusted position on the frame bar 21, the holes being on an arc whose center is the pivot 62. This mounting enables the plate to be adjusted to different angles relative to the frame to angularly adjust the land wheel 26 so that it may run parallel with the direction in which the plow is being pulled.

The land wheel 26 can also be raised up and down to raise and lower the land side of the plow by means of a lever 65 connected rigidly to the axle as illustrated in Fig. 3. This lever has a hand operated latch operating over a toothed sector 67 fixed to the plate 61. By releasing the latch and swinging the lever the crank axle 60 may be swung to raise or lower the land wheel, the latch being used to hold the crank axle in the position to which it is swung. A spring 68 connected at one end to the upper end of lever 65 and at its other end to a bar 69 fixed to the frame, urges the lever in a direction to raise the plow and thus assist the operator in pulling the lever in a direction to raise the plow so as to make this operation easier than it otherwise would be.

The rear furrow wheel 25 is journaled on an inclined axle 70 (Fig. 4) which has a curved portion 71 and a vertical portion 72, the vertical portion being slidably mounted in a bearing bracket 73 adjustably fixed to the plow frame in a manner that will be later described. The bracket 73 has a rearward extension 74 to which is pivoted a U-shaped link 75 that, in turn, is pivotally connected to one end of a hand lever 76. The hand lever is pivoted at 77 to a bracket 78, the lever being adapted to swing on the pivot 77. The bracket 78 is held against sliding movement on the vertical portion 72 of the rear axle by a collar 79 fixed to the axle. This construction permits the axle to turn on its vertical axis independently of the bracket 78 but prevents relative longitudinal movement between the bracket and axle. The lever 76 carries a hand operated latch 80 operating over a toothed sector 81 formed integral with the bracket 78. When the lever 76 is pushed downwardly from the position illustrated in Fig. 4 it pulls upward on the link 75 and raises the plow frame relative to the rear wheel 25. In this manner the rear end of the frame may be raised and lowered as desired and held in adjusted position.

An important feature of the invention is the novel mounting of the rear furrow wheel that enables it to occupy the most efficient position for every angular position of the plow.

The bracket 73 in which the rear axle is journaled is adjustably secured to a rear frame member 90 having an arcuate portion 91. The center about which the radius swings for obtaining the curvature of the portion 91 is the center of the last disk 16, that is, the right-hand disk in Fig. 2. The frame member 90 has a shoulder 93 fitting the beam 10 and it is fixed thereto by the bolts 94 and 95. It also has an overlapping extension 96 that fits over the top of the beam 10 to enable the parts to be more securely and accurately held together. It is further braced by a brace bar 97 connected at one end to the frame member 90, the other end of said brace bar being connectible either to the frame bar 21 as shown in Fig. 2 or to the cross brace 23 as shown in Fig. 1.

The bracket 73 also has an extension 100 (Figs. 4 and 5) said extension having an under cut slot in it shaped to receive the arcuate portion 91 of the member 90. The extension 100 has downwardly extending fingers or flanges 101 fitting over the rib 92 of member 90. This extension also has a lower set of flanges or fingers 102 (Fig. 5) that fit over a rib 103 on the lower side of the arcuate portion 91 of member 90. As will be clear from Fig. 4, the extension 100 can be adjusted along the arcuate portion 91 of bracket 90, the extension being entirely removable at one end of the portion 91. The extension is held rigidly in adjusted position by bolts 105 adapted to pass through selected holes 106 in the arcuate portion 91 of bracket 90.

If, when the parts are in the position of Figs. 4 and 5, slight pressure is put on lever 76, the U-shaped member 75 tends to pull up on bracket 73 with the axle 72 as a fulcrum. This tends to raise the bracket 73 relative to the frame member 90. Inasmuch as the major portion of the weight of the plow frame is carried by the plowing disks 16, the bracket 73 can be moved upward without having to raise all the weight of the rear of the plow frame with the result that pressure on the bolts 105 is relieved so that they may be easily removed. After they have been removed, the bracket 73 can be moved along the arcuate rib 91 in either direction to get the proper adjustment. The most efficient position of the rear furrow wheel is a position such that the rib on the circumference of the wheel runs straight ahead in the deepest part of the furrow. Heretofore, the adjustments of the wheel have been about the vertical portion of the wheel axle, as, for example, the portion 72 of axis 20. Such adjustability does not permit the wheel to be accurately positioned except when the plow is in one angular position. With the present construction, the wheel can be properly positioned for all angular positions of the plow because the center about which the adjustment takes place is the center of the last disk 16. The wheel can, of course, also be turned about the axis of axle 72.

The rear wheel 25 is free to swing clockwise as viewed in Fig. 4, or to the left when the plow is viewed from the rear, but its movement is limited in the opposite direction by a downwardly extending stop rod 110 fixed in an extension 111 of the bracket 73. This construction allows the rear wheel to swing freely when the plow is being turned to the left, as it is in turning at the ends of a field, but limits the wheel to the proper angle when the plow is being drawn forward in plowing.

The turning and stirring of the soil is done by the concave disks 16 which, as previously explained, are preferably arranged in gangs but all connected together so that they will rotate in unison. The angular position of these disks relative to the direction of travel of the plow causes a heavy side thrust. In order to take care of this thrust the end of the disk shaft 15 engages the end of a thrust shaft 120 (Fig. 4) that, in turn, engages a thrust bearing of any suitable type located in a housing 121 (Fig. 4) attached to the rear frame bracket 90.

The plow embodies a novel combination of parts that are constructed of such size and shape, and arranged together in such a way as to obtain unusually efficient operation. The plowing disks have a diameter of approximately twenty six inches and they are spaced about ten inches apart. Also, they are polished. The large diameter enables the disks to be spaced farther apart without destroying the capacity of the plow to turn all the soil in its path. Plows of this type are often used in wheat stubble where there is considerable straw and trash that tends to clog between the disks. The wide spacing of the disks combined with their large diameter which puts the disk shaft high above the ground, and the fact that the space between the disks is not filled with large disk supports or disk scrapers but by narrow arms, practically eliminates all clogging.

The large diameter disks tend to put the plow frame relatively high above the ground where it is out of the way of obstructions and the low hitch tends to throw the weight of this frame on the disks to assist them in penetrating. The polished disks enter the ground easily and they scour well, the net result of the whole combination being an unusually efficient, easy working, non-clogging plow that requires a minimum of draft for pulling it across a field.

The width of cut may be varied not only by adjusting the angle of the disk shaft to the direction of travel but the size or width of the plow may also be varied by the novel mounting to the disks in groups which permits the number of disks to be varied. For example, referring to Fig. 1, the three left hand disks are shown disconnected from the beam 10, the next three are attached in a group (Fig. 2), and the last five constitute a third group attached to beam 10. As shown, the plow is operating with eight disks, the bracket for supporting the rear furrow wheel being connected to the beam 10 immediately to the left of the left hand disk. If it is desired to cut a considerably wider path the bracket is disconnected and moved out to the end of the beam 10 and the set of disks shown at the left hand end of Fig. 1 is connected to the beam 10. This makes a plow with eleven disks instead of eight and enables considerably wider cuts to be made. At the same time, the widths of cut may be further varied by adjusting the angle of the eleven disk plow in the same manner that the angle of the eight disk plow is varied, that is, by varying the angle of the disk shaft to the line of travel.

It is to be understood that the construction shown is for the purpose of illustration and that variations may be made in it without departing from the spirit and scope of the invention as defined in the appended claims.

I claim:

1. A plow having a frame, a plurality of disks mounted on said frame to rotate in unison about a common axis, a front furrow wheel, a land wheel and a rear furrow wheel for said frame, said rear furrow wheel being journaled on an axle having a vertical portion swiveled in a bearing, and a frame member having an arcuate portion on which said bearing is adjustably mounted.

2. A plow having a frame, a plurality of plowing disks carried by said frame so as to rotate in unison, a rear furrow wheel for said plow, and means for connecting said rear furrow wheel to said frame so that it may be adjusted in a horizontal plane about a center substantially coincident with the center of the last plowing disk of said plow.

3. A plow having a frame, a plurality of plowing disks mounted to rotate in unison about a common axis located at an angle to the direction of travel of the plow, said frame having a front furrow wheel, a land wheel, and a rear furrow wheel, a bearing member in which the axle of the rear furrow wheel is journaled so as to swing about a vertical axis, said rear furrow wheel axle being free to swing about its axis in one direction, but being limited against movement in the other direction, and adjustable mounting means for connecting said bearing member to said frame so that the member may be adjusted in a horizontal plane to vary its angular position relative to the axis of the disks.

4. A plow having a frame, a plurality of plowing disks mounted to rotate in unison about a common axis located at an angle to the direction of travel of the plow, said frame having a front furrow wheel, a land wheel and a rear furrow wheel, said rear furrow wheel being journaled on an axle swiveled in a bearing member so as to swing about a vertical axis, and adjustable means for mounting said bearing member on said frame so that said bearing member may be adjusted in a horizontal plane about a center substantially coincident with the center of the last plowing disk of said plow.

In testimony whereof, I have subscribed my name.

JOHN P. SEAHOLM.